(12) United States Patent
Francis et al.

(10) Patent No.: US 7,509,502 B2
(45) Date of Patent: Mar. 24, 2009

(54) DATA PROCESSING APPARATUS AND METHOD FOR MERGING SECURE AND NON-SECURE DATA INTO AN OUTPUT DATA STREAM

(75) Inventors: Hedley James Francis, Newmarket (GB); Ashley Miles Stevens, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 901 days.

(21) Appl. No.: 10/931,210

(22) Filed: Sep. 1, 2004

(65) Prior Publication Data

US 2005/0097341 A1    May 5, 2005

(30) Foreign Application Priority Data

Sep. 26, 2003    (GB) .................................. 0322631.3

(51) Int. Cl.
G06F 12/14    (2006.01)
G06F 13/14    (2006.01)

(52) U.S. Cl. ........................ 713/193; 713/194; 345/604; 345/502; 345/503; 345/520; 345/533; 345/535; 345/536; 725/94; 725/146

(58) Field of Classification Search ................. 380/212; 713/193, 194; 345/604, 502, 503, 520, 533, 345/535, 536; 725/94, 146
See application file for complete search history.

(56) References Cited

U.S. PATENT DOCUMENTS 5,953,416 A  *  9/1999  Hasebe et al. ................ 713/189
6,026,164 A  *  2/2000  Sakamoto et al. ........... 380/217

(Continued)

FOREIGN PATENT DOCUMENTS

EP    0 766 471 A1    4/1997

(Continued)

OTHER PUBLICATIONS

Nason, et al. WIPO Publication WO 02/101526 A2, Dec. 19, 2002.*

*Primary Examiner*—Kambiz Zand
*Assistant Examiner*—Michael J Simitoski
(74) *Attorney, Agent, or Firm*—Nixon & Vanderhye P.C.

(57) ABSTRACT

The present invention provides a data processing apparatus and method for merging secure and non-secure data. The apparatus comprises at least one processor operable to execute a non-secure process to produce non-secure data to be included in an output data stream, and to execute a secure process to produce secure data to be included in the output data stream. A non-secure buffer is provided for receiving the non-secure data produced by the non-secure process, and in addition a secure buffer is provided for receiving the secure data produced by the secure process, the secure buffer not being accessible by the non-secure process. An output controller is then arranged to read the non-secure data from the non-secure buffer and the secure data from the secure buffer, and to merge the non-secure data and the secure data in order to produce a combined data stream, the output data stream then being derivable from the combined data stream. It has been found that such an approach assists in improving the security of the secure data, and in reducing memory bandwidth requirements and the processing requirements of the processor.

48 Claims, 8 Drawing Sheets

U.S. PATENT DOCUMENTS

| | | |
|---|---|---|
| 6,118,870 A | 9/2000 | Boyle et al. |
| 7,030,891 B2 * | 4/2006 | Alcorn et al. ............... 345/629 |
| 7,165,175 B1 * | 1/2007 | Kollmyer et al. ............ 713/154 |
| 7,177,279 B2 * | 2/2007 | Kataria ....................... 370/235 |
| 7,203,844 B1 * | 4/2007 | Oxford ....................... 713/193 |

FOREIGN PATENT DOCUMENTS

| | | |
|---|---|---|
| WO | 01/27818 A1 | 4/2001 |
| WO | 02/21761 A2 | 3/2002 |
| WO | 02/101526 A2 | 12/2002 |

* cited by examiner

DATA PROCESSING APPARATUS AND METHOD FOR MERGING SECURE AND NON-SECURE DATA INTO AN OUTPUT DATA STREAM

BACKGROUND OF THE INVENTION

1. Field of the Invention

The present invention relates to a data processing apparatus and method for merging secure and non-secure data into an output data stream.

2. Description of the Prior Art

Data providers are often keen to take steps to protect certain valued data from unauthorised copying and/or distribution. For example, providers of content such as films, images, music, etc often distribute that data in an encoded form, such that only authorised users with an appropriate decoder can access that data. For the purposes of the following description, data which is considered valuable by the data provider, and for which it is hence desired to inhibit unauthorised copying and distribution, will be referred to herein as "secure data", as contrasted with "non-secure data" which will be used to refer to data which is not subjected to such constraints.

Apparatus used to decode and output secure data may also be used to handle and output non-secure data, and often this may require both secure data and non-secure data to be merged into a single output data stream. Considering as an example a computer system, it may be desired to display non-secure data in the form of a graphical user interface, whilst within a particular window of that graphical user interface it is desired to display secure data, such as a film or a sequence of images. Merging of such secure and non-secure data in order to produce an output data stream for display can be performed by software within the computer system, and will typically result in the merged data being placed in a frame store, from where it will then be read by a display controller in order to generate the necessary signals to the display device.

Two particular problems arise with such an approach. Firstly, considering the security issue, it can be seen that once the secure data has been decoded, it may be subjected to several processing steps in order to perform any necessary manipulation of the secure data prior to its merging with the non-secure data, and then the actual merging process will be performed, before that data is then placed in the frame store. During this time, the secure data may be vulnerable to unauthorised access which might then allow the secure data in its decoded form to be copied and subsequently distributed. Secondly, the process of merging these two different data sources is both processor intensive, and also memory bandwidth intensive due to the number of accesses required to the memory system storing the data.

Accordingly, it would be desirable to provide an improved apparatus and method for merging secure and non-secure data into an output data stream.

SUMMARY OF THE INVENTION

Viewed from a first aspect, the present invention provides a data processing apparatus, comprising: at least one processor operable to execute a non-secure process to produce non-secure data to be included in an output data stream, and to execute a secure process to produce secure data to be included in the output data stream; a non-secure buffer operable to receive the non-secure data produced by the non-secure process; a secure buffer operable to receive the secure data produced by the secure process, the secure buffer not being accessible by the non-secure process; and an output controller operable to read the non-secure data from the non-secure buffer and the secure data from the secure buffer and having merging logic operable to merge the non-secure data and the secure data in order to produce a combined data stream, the output controller being further operable to derive the output data stream from the combined data stream.

In accordance with the present invention, separate buffers are provided for storing the non-secure data and the secure data, with these separate buffers then being accessible by the output controller. The secure buffer used to receive the secure data produced by a secure process is arranged such that it is not accessible by a non-secure process used to produce the non-secure data. The output controller is operable to read the non-secure data from the non-secure buffer and the secure data from the secure buffer, and incorporates merging logic which is used to merge the non-secure data and the secure data in order to produce a combined data stream from which the output data stream is then derived.

By such an approach, once the secure data has been produced by the secure process, it can be placed directly within a secure buffer which is not accessible by the non-secure process, without requiring further processing steps to first be taken. The job of merging the secure data with the non-secure data is then undertaken by the output controller. Since the output controller is a device designed for a specific, dedicated purpose, namely to generate the output data stream for sending to an output device, it is not typically required to provide any mechanism for accessing the data being processed internally within the output controller, and accordingly the output controller can readily be designed as a secure device such that the data being processed internally within the output controller cannot be accessed by any non-secure process. Thus, the secure nature of the secure data can readily be maintained whilst the merging logic within the output controller is performing the necessary merging operation in order to produce the combined data stream.

Further, whilst both the non-secure buffer and the secure buffer might typically reside within the memory system, and accordingly the output controller will need to access the memory system to read the non-secure data and the secure data from those buffers, the merging then takes place internally within the output controller without requiring the combined data stream to be written back to the memory system, and hence this approach reduces the number of accesses required to the memory system, and accordingly reduces the memory bandwidth incurred when performing such merging operations, thereby enabling the memory system to be more readily accessed by other devices and processes within the data processing apparatus.

It will be appreciated that there are a number of ways in which the secure buffer can be arranged so that it is not accessible by the non-secure process. In one embodiment, the processor is operable to manage access permission data for the secure buffer, and to define the access permission data such that the secure buffer is not accessible by the non-secure process. In one particular embodiment, the access permission data may be maintained by the processor within a particular control register, with the processor only being able to alter the access permission data when operating in a particular secure mode of operation. By appropriate setting of the access permission data for the secure buffer, it can be ensured that any non-secure processes are unable to access the secure buffer.

Typically, the non-secure buffer and the secure buffer may be provided within a memory system of the data processing apparatus. In an alternative embodiment, the memory system is operable to manage access to the secure buffer, and to prevent access to the secure buffer by the non-secure process. Hence, in this embodiment, it is the memory system itself which polices access to the secure buffer, to ensure that any non-secure process cannot access the secure buffer.

In an alternative embodiment, the secure buffer itself may be arranged so that its content cannot be read by the processor. For example, the secure buffer may be arranged as a write-only buffer such that any processes executing on the processor can only write data into that secure buffer, and cannot read the contents from the secure buffer, thereby preventing any unauthorised access to the secure buffer by a non-secure process. The only device that would then be allowed to read the contents of the secure buffer would be the output controller.

In order to merge the non-secure data and the secure data, the merging logic will typically require both the non-secure data and the secure data to be in the same format. One way of ensuring that this requirement is complied with is to arrange both the non-secure buffer and the secure buffer so that they only store data in one predetermined format. However, in one embodiment of the present invention the merging logic is arranged to receive the non-secure data and the secure data in a first predetermined format, at least one of the non-secure and secure buffers being operable to store data in a second predetermined format, the output controller further comprising conversion logic associated with the at least one of the non-secure and secure buffers and operable to convert data received from that buffer from the second predetermined format into the first predetermined format prior to that data being received by the merging logic.

Such an approach can lead to improved efficiency in certain embodiments, since it avoids the need for any processing to be performed on the data in the second predetermined format before that data can be stored within the relevant buffer. This hence reduces bandwidth requirements that would otherwise be needed to allow the necessary memory accesses to take place whilst performing such processing. Another benefit of such an approach is that in situations where the second predetermined format is a more efficient format than the first predetermined format, this can reduce the space required to store the non-secure data and the secure data within the memory system.

In one particular embodiment, it is the secure buffer that is operable to store the secure data in the second predetermined format, with the conversion logic within the output controller then being responsible for converting that secure data into the first predetermined format prior to it being received by the merging logic.

Whilst the above-described techniques of embodiments of the present invention improve the security of the secure data between the time it is decoded and the time it is incorporated within the combined data stream, another area of concern from a security point of view is the output data stream, and in particular the issue of whether the secure data might be accessed in an unauthorised manner from the output data stream. In one embodiment, the data processing apparatus further comprises an output device connected to the output controller to receive the output data stream. Hence, in such embodiments, the output device is incorporated within the apparatus itself, and is arranged to directly receive the output data stream from the output controller, thus ensuring that the output data stream is not accessible by any non-secure process. As an example, considering an embodiment where the secure data takes the form of a moving or still image, the data processing apparatus may take the form of a portable system with a built in display, for example a Liquid Crystal Display (LCD).

However, in an alternative embodiment, the output device may be detachable, or indeed the data processing apparatus may be arranged to generate an output data stream for outputting to a separate output device. As an example, considering again an embodiment where the secure data is moving or still image data, the data processing apparatus may have a DVI digital interface for outputting the output data stream to a suitable display device. In such embodiments, there may be some concern that the secure data could be accessed in an unauthorised manner from the output data stream. In such embodiments, the output controller may further comprise encryption logic operable to encrypt the combined data stream prior to output as the output data stream, whereby the output data stream is not accessible by any non-secure process. It will be appreciated that the encryption performed could be any one of a number of known techniques, with suitable decryption processes then being employed within the receiving output device.

In an alternative embodiment, or in addition, the output controller may be arranged to provide a watermark in the output data stream. Whilst this will in itself typically not prevent unauthorised copying and distribution, it will provide information about the source of the unauthorised copy, and accordingly can be a useful measure to deter unauthorised copying of the secure data.

In other embodiments, the output controller may further comprise a digital to analogue converter for converting the combined data stream into an analogue signal prior to output as the output data stream. Generally, it is less desirable to copy the secure data once it has been converted into an analogue form, since the quality of that data tends to decrease with multiple copying. Accordingly, in such embodiments, it may be considered unnecessary to include encryption logic and/or watermarking processes, although of course either or both these approaches could still be used.

It will be appreciated that the secure data can take a variety of forms. For example, in one embodiment, the secure data may be audio data. However, in one embodiment, the output controller is a display controller, the non-secure data and secure data are display data, the non-secure buffer is a non-secure frame store, and the secure buffer is a secure frame store. In such embodiments, the output data stream may take the form of a frame of display data.

In embodiments where the secure data is display data, the conversion logic may be arranged to perform a colour space conversion process. As will be appreciated by those skilled in the art, a colour space conversion process is required to convert between different display formats. In one embodiment, the first predetermined format is an RGB format, the second predetermined format is a YUV format, and the at least one of the non-secure and secure buffers is operable to store image data in said YUV format. Typically, video decompression produces a YUV format which can be more efficient than the equivalent RGB image in terms of storage space due to colour subsampling, and hence the YUV format is often used to represent image data, whether that image data be moving data such as films, or still image data such as pictures. However, it is often the case that a display controller will operate on data in an RGB format, and accordingly the conversion logic within the display controller can be used to convert YUV data into RGB data prior to that data being received by the merging logic.

It will be appreciated by those skilled in the art that there are other processing steps that may be required to be performed on image data prior to display. In one embodiment, the display controller further comprises filtering logic operable to perform a filtering process on image data received from an associated one of said non-secure and secure frame stores prior to that image data being received by the merging logic. As will be appreciated by those skilled in the art, such filtering processes may involve deblocking and deringing to remove artefacts which can arise from the way the image is originally encoded. By incorporating such filtering processes within the display controller, this can further reduce the processing overhead that would otherwise be incurred by the processor, and also reduce the memory bandwidth required.

In one embodiment, the display controller further comprises scaling logic operable to perform a scaling process on image data received from an associated one of said non-secure and secure frame stores prior to that image data being received by the merging logic. As will be appreciated by those skilled in the art, scaling of image data may be required in order to enable that image data to be placed within the desired display portion of the display, for example a particular window within a graphical user interface. Again, performing such scaling operations within the display controller reduces the processing required to be performed by the processor, and also reduces the memory bandwidth required for such image processing.

In one embodiment, the secure data takes the form of secure image data, and the conversion logic, filtering logic and scaling logic are associated with the secure frame store. Accordingly, the secure image data can be stored by the secure process directly within the secure frame store, with the necessary colour space conversion, filtering and scaling being performed internally within the display controller once the display controller has read the secure image data from the secure frame store.

Viewed from a second aspect, the present invention provides an output controller for a data processing apparatus, the data processing apparatus having at least one processor operable to execute a non-secure process to produce non-secure data to be included in an output data stream, and to execute a secure process to produce secure data to be included in the output data stream, a non-secure buffer operable to receive the non-secure data produced by the non-secure process, and a secure buffer operable to receive the secure data produced by the secure process, the secure buffer not being accessible by the non-secure process, the output controller comprising: at least one read interface operable to read the non-secure data from the non-secure buffer and the secure data from the secure buffer; merging logic operable to merge the non-secure data and the secure data in order to produce a combined data stream; and output means operable to derive the output data stream from the combined data stream.

Viewed from a third aspect, the present invention provides a method of merging secure and non-secure data into an output data stream, comprising the steps of: executing a non-secure process to produce the non-secure data to be included in the output data stream; executing a secure process to produce the secure data to be included in the output data stream; storing the non-secure data in a non-secure buffer; storing the secure data in a secure buffer, the secure buffer not being accessible by the non-secure process; employing an output controller to read the non-secure data from the non-secure buffer and the secure data from the secure buffer; merging within the output controller the non-secure data and the secure data in order to produce a combined data stream; and deriving the output data stream from the combined data stream.

DESCRIPTION OF THE DRAWINGS

The present invention will be described further, by way of example only, with reference to a preferred embodiment thereof as illustrated in the accompanying drawings, in which.

DESCRIPTION OF EMBODIMENTS

Figure 1:
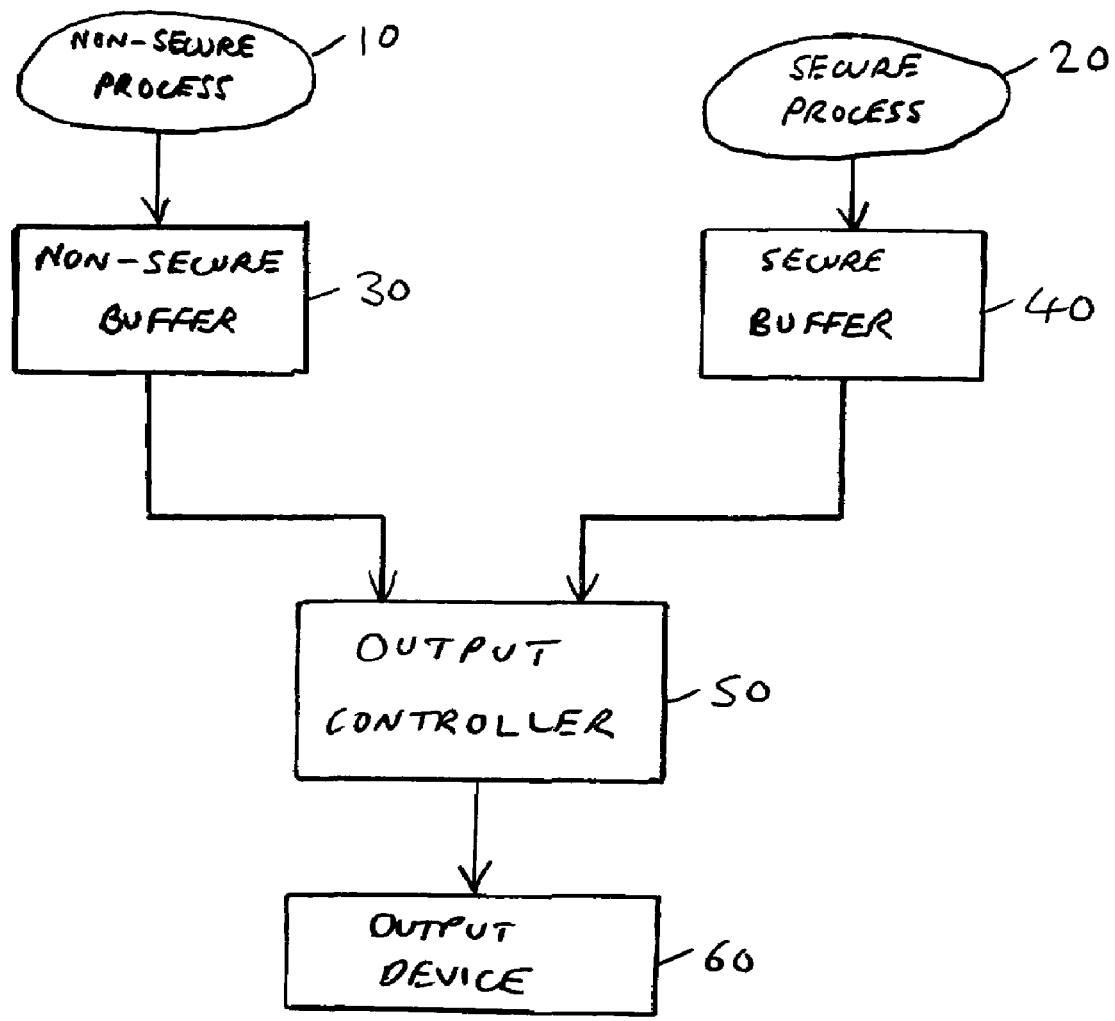
FIG. 1 is a diagram schematically illustrating the approach taken in embodiments of the present invention for merging secure and non-secure data into an output data stream.

FIG. 1 is a diagram schematically illustrating the approach taken in preferred embodiments of the present invention in order to merge secure and non-secure data into an output data stream. A non-secure process 10 executing on a processor is used to produce non-secure data which is then output to a non-secure buffer 30 accessible by the output controller 50. In addition, a secure process 20 executing on a processor (which may be the same processor or a different processor to that executing the non-secure process 10) is used to produce secure data which is then stored in a secure buffer 40 which is also accessible by the output controller 50.

The output controller 50 is then arranged to read the non-secure data from the non-secure buffer 30 and the secure data from the secure buffer 40, and to merge the non-secure data and the secure data in order to produce an output data stream which is output from the output controller 50 to a connected output device 60. In one embodiment, the non-secure buffer 30 and the secure buffer 40 may be arranged to store audio data, and the output controller 50 takes the form of an audio controller used to generate a merged audio output stream for outputting to an output device 60, which will typically take the form of one or more speakers. In an alternative embodiment, the non-secure buffer 30 and the secure buffer 40 take the form of frame stores used to store display data, the output controller 50 then taking the form of a display controller, and the output device 60 taking the form of a display device, for example an integrated LCD forming part of the data processing apparatus, or some other form of integrated or separate display device.

The secure buffer 40 is arranged so that it cannot be accessed by a non-secure process such as the non-secure process 10. The output controller 50 then takes the form of an essentially secure peripheral device which is arranged to read the contents of the secure buffer 40.

Figure 2A:
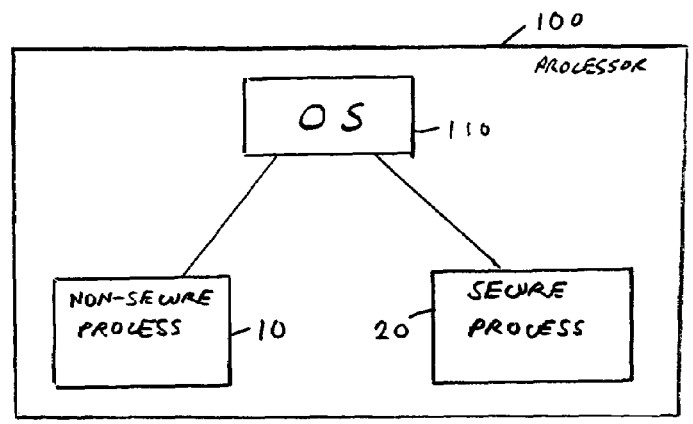
FIGS. 2A to 2C schematically illustrate how the non-secure process and secure process are arranged in different embodiments of the present invention.
Figure 2B:
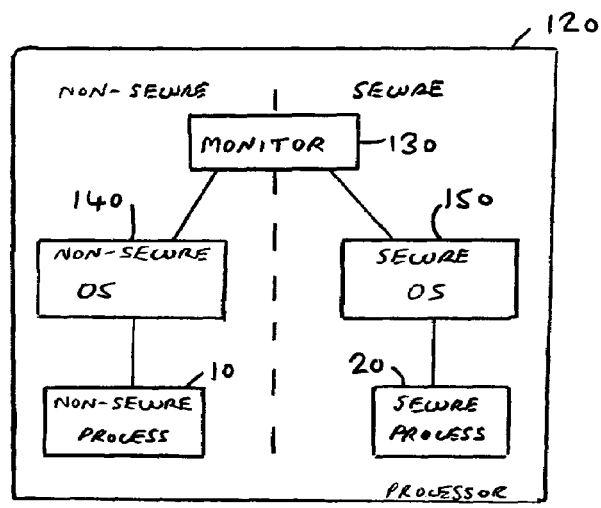
Figure 2C:
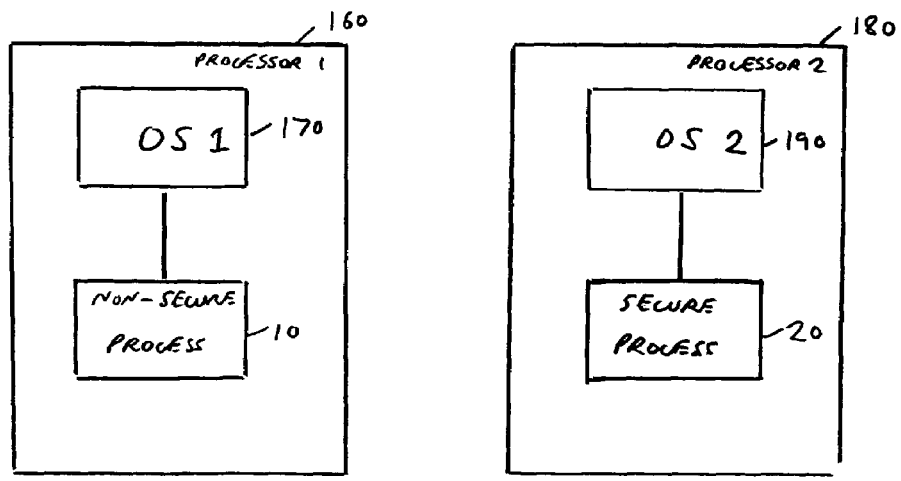

FIGS. 2A to 2C illustrate different ways in which the non-secure process 10 and the secure process 20 can be executed in accordance with different embodiments of the present invention. In accordance with FIG. 2A, both the non-secure process 10 and the secure process 20 are run by the same operating system 110 running on a processor 100.

FIG. 2B schematically illustrates an alternative embodiment, in which various programs running on a processor 120 are run in either a secure domain or a non-secure domain. The system is provided with a monitor program 130 which executes at least partially in a monitor mode. The monitor program 130 is responsible for managing all changes between the secure domain and the non-secure domain in either direction. From a view external to the processor 120, the monitor mode is always secure and the monitor program is in secure memory.

Within the non-secure domain, there is provided a non-secure operating system 140, and the non-secure process 10 is arranged to run on that non-secure operating system. In the secure domain, a secure operating system 150 is provided, and the secure process 20 is arranged to run on that secure operating system. In one embodiment, the secure operating system 150 is designed to provide only those functions which are essential to processing activities which must be provided in the secure domain such that the secure operating system can be as small and simple as possible since this will tend to make it more secure.

The arrangement illustrated in FIG. 2B is that employed within ARM's Trustzone product, more details of which are available from ARM Limited in Cambridge (see for example the document at www.arm.com/armtech/TrustZone?OpenDocument).

In an alternative embodiment illustrated in FIG. 2C, separate processors 160 and 180 are used to run the non-secure process 10 and the secure process 20, respectively. In particular, a first operating system 170 is provided on the first processor 160, and the non-secure process 10 runs on that operating system. In addition, a second operating system 190 is provided on the second processor 180, and the secure process 20 runs on that operating system.

As discussed earlier with reference to FIG. 1, irrespective of what approach is used, it is important to ensure that the secure buffer 40 cannot be accessed by the non-secure process 10, or indeed by any non-secure operating system. This can be achieved in a variety of ways. In one embodiment, the processor may manage access permission data for the secure buffer 40, and is arranged to define the access permission data such that the secure buffer 40 is not accessible by any non-secure process. In one particular embodiment, this access permission data is stored within a control register which is accessible by the processor, with the processor only being able to alter the access permission data when operating in a secure manner. In an alternative embodiment, the memory system in which the non-secure buffer and the secure buffer are provided may itself be arranged to manage access to the secure buffer so as to prevent access to the secure buffer by the non-secure process. As an example, the memory system may be arranged such that part of the memory system is defined as secure memory, and another part of the memory system is defined as non-secure memory. A mechanism will then be provided for enabling the memory system to determine whether any particular memory access request is being issued by a secure process or a non-secure process, so that accesses to the secure memory (including the secure buffer) are only allowed by secure processes.

In another alternative embodiment, the secure buffer may be designed so that its content cannot be read by the processor. As an example, the secure buffer may be arranged to be a write-only buffer, so that its contents cannot be read by any process operating on the processor. Instead, the only device that is authorised to read the contents from the secure buffer will be the output controller.

By taking one of the above approaches, it can be ensured that once the secure data has been written within the secure buffer, it cannot be accessed in an unauthorised manner.

In one embodiment, the non-secure data and the secure data take the form of display data to be output to a display device, and hence the output controller takes the form of a display controller. A display controller will typically be arranged to access display data from a frame store and to subsequently pass that display data to a display together with any synchronisation and timing signals that may be required. In accordance with one embodiment of the present invention, the display controller is arranged to read display data from both a non-secure frame store and a secure frame store, and in addition incorporates further logic to enable the non-secure data and the secure data read from those frame stores to be merged into a single output frame of display data for outputting to a display device.

Figure 3:
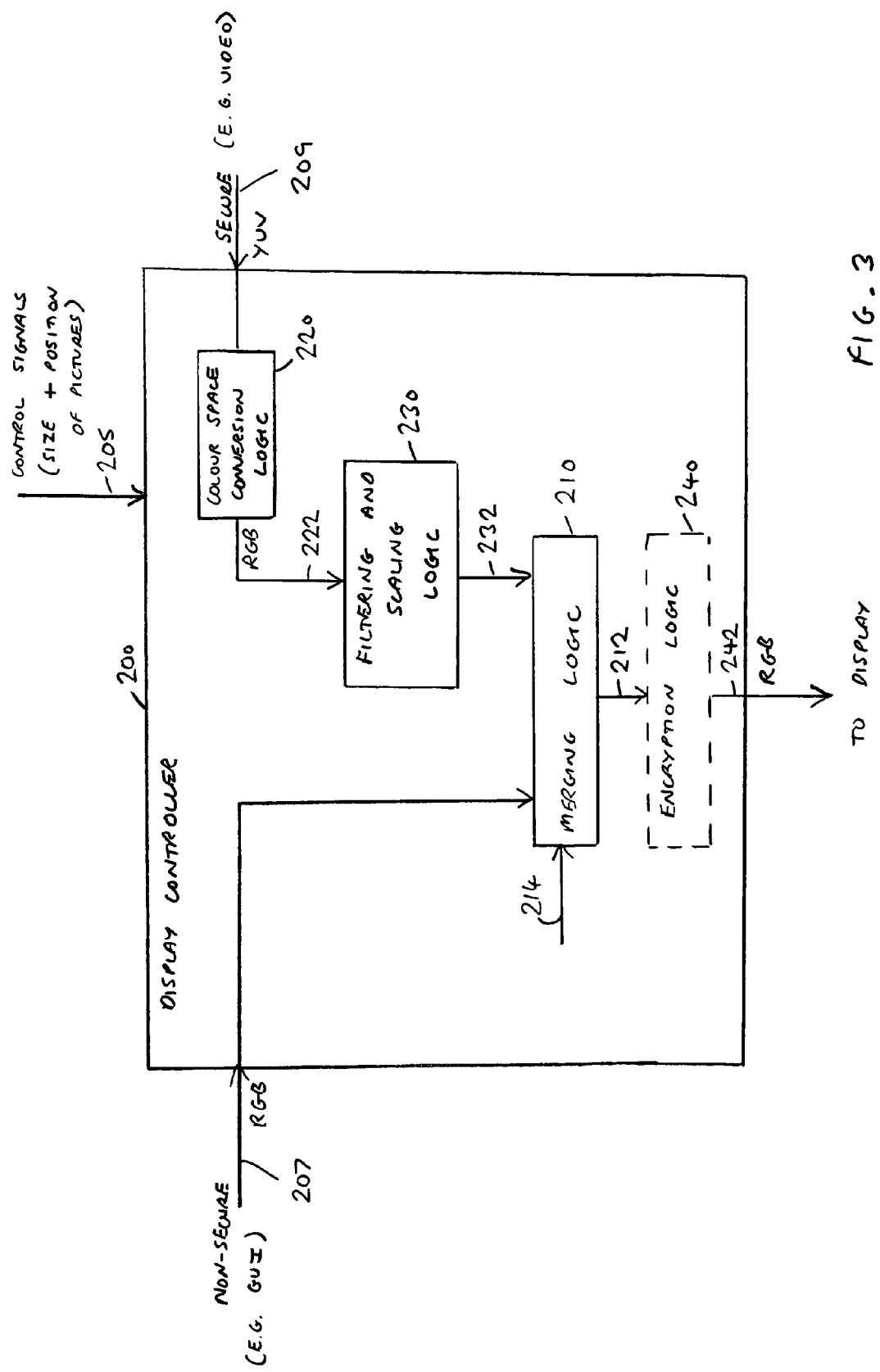
FIG. 3 is a block diagram schematically illustrating logic incorporated within a display controller in accordance with one embodiment of the present invention.

FIG. 3 is a block diagram schematically illustrating the additional logic provided within a display controller 200 in accordance with one embodiment of the present invention to enable such merging to take place. In this embodiment, it is assumed that the non-secure data from the non-secure frame store is already in an RGB format and appropriately scaled ready for display. In one typical example, such non-secure data may be data relating to the display of a graphical user interface (GUI) on a display device. In such an embodiment, the secure data may take the form of secure image data for display within a particular window of the GUI. This secure image data may be moving image data, e.g. video data, or may be still image data, e.g. pictures. Whilst the secure image data may be arranged to be stored within the secure frame store in the same format as the non-secure data, in this example in the RGB format, it is often the case that such image data is actually encoded in a different format, for example a YUV format, and in such instances it may be more efficient to store the secure data in the secure frame store in that YUV format.

In such situations, the display controller 200 then includes colour space conversion logic 220 for converting the secure image data into the same format as that used in respect of the non-secure data. Accordingly, in this example, the colour space conversion logic 220 will be arranged to receive the secure image data from the secure frame store over path 209 in YUV format, and to convert that data into an equivalent RGB signal for outputting over path 222. In one embodiment, the colour space conversion logic 220 is formed by a dedicated piece of hardware arranged to perform the required colour conversion, although in alternative embodiments the colour conversion logic may be implemented by appropriate software running on a processor within the display controller.

Techniques for performing colour space conversion will be well-known by those skilled in the art, and accordingly will not be discussed in more detail herein. The main difference between typical prior art approaches and the approach taken by the embodiment of the present invention illustrated in FIG. 3 is that this colour space conversion is actually performed within the display controller 200 rather than having been performed prior to the data being stored within the frame store, and allows the display controller to handle two streams of different formats. This has been found to reduce the demands on the processor of the data processing apparatus, and to reduce memory bandwidth demands.

As will be appreciated by those skilled in the art, due to the way that image data such as video is encoded, it is often necessary to perform some filtering upon the decoded data in order to remove artefacts that are introduced into the image data as a result of the encoding process. Examples of such filtering processes are deblocking and deringing. In accordance with embodiments of the present invention, rather than having to perform such filtering processes prior to storing the decoded secure data within the secure frame store, such filtering is provided by the filtering and scaling logic 230 provided within the display controller 200. In addition to any appropriate filtering, the filtering and scaling logic 230 is arranged to perform any necessary scaling of the image to enable it to be placed within the desired display area of the display device, for example within a specified window of the GUI displayed upon the display device. The display controller 200 is arranged to receive various control signals over path 205, these signals typically being issued from the processor core. Included within this control information will be some size information used by the scaling logic 230 to determine whether any appropriate scaling of the image data is required to enable it to be placed within the desired portion of the display.

In one embodiment, the filtering and scaling logic takes the form of a dedicated hardware logic block provided within the display controller 200, although in alternative embodiments it is possible for at least some of the filtering and scaling function to be implemented by appropriate software running on a processing device within the display controller 200. As such filtering and scaling functions are well-known by those skilled in the art, they will not be discussed in more detail herein. The main point to note however is that whereas in typical prior art approaches such filtering and scaling functions are performed prior to the data being stored within the frame store, in embodiments of the present invention these filtering and scaling functions are instead performed within the display controller 200 once the data has been read out of the secure frame store. Through such an approach, a significant reduction in memory bandwidth traffic can be realised.

As will be appreciated by those skilled in the art, if the input data from the secure frame store does not require any colour space conversion, and/or does not require filtering or scaling, the relevant logic blocks 220, 230 can be bypassed. Further, as will be appreciated by those skilled in the art, although the colour space conversion logic 220 and filtering and scaling logic 230 are shown in association with the path from the secure frame store, they can equally well be provided on the path associated with the non-secure data from the non-secure frame store, if appropriate.

The merging logic 210 within the display controller 200 is arranged to receive the RGB data from the non-secure frame store over path 207, and is arranged to receive over path 232 the secure data from the secure frame store, after that data has been subjected to any necessary colour space conversion, filtering and/or scaling functions. The merging logic 210 is then arranged to merge the non-secure data and the secure data in order to produce a single combined data stream from which the output frame of display data can be derived. As will be appreciated by those skilled in the art, there are a number of techniques which can be used for merging the two data streams. In accordance with one approach, the secure image data may be overlaid in an opaque manner on the non-secure display data at a location defined by position information contained within the control signals 205. This may result in the secure image data occupying the full screen or some portion of it.

In an alternative embodiment, the merging logic may be arranged so as to overlay the non-secure display data on top of the secure image data, with a transparent hole being defined to allow the secure image data to be seen. It will be appreciated that there are a number of ways in which the transparent hole can be defined. In one embodiment, the transparent hole may be defined by position information within the control signals 205. Alternatively, the transparent hole may be defined by a specific colour number in the non-secure display data, which allows for irregularly shaped holes. For example, if the non-secure data takes the form of a GUI, a window of a particular colour within the window display may be defined such that the secure image data appears in that window.

Another known technique for merging two streams of display data is known as Alpha blending. In accordance with this technique, the non-secure display data may be provided with a separate channel identifying a transparency level, this channel being known as an Alpha channel (A channel). Accordingly, in accordance with this technique, the signal from the non-secure frame store is in an RGBA format, with the A channel information being used to determine the transparency of the associated display data. By appropriate selection of transparency levels, the secure image data can be viewed through a transparent hole established within the GUI display data via the A channel data.

It is also possible to incorporate some non-secure data within the display area used to display the secure data. For example, some graphical or textual information may be included within that area as part of the GUI display data, for example start/stop graphics, time codes, number of pictures taken, etc. When employing the approach where a specific colour is used to define the window that is to act as a transparent hole through which the secure image data is viewed, then such additional data can be represented in any colour other than that specified colour. When using the Alpha blending approach, then the colour of that additional data is not a constraining factor, and all that is required is for the associated Alpha data to have a value that ensures that that data is not completely transparent, and accordingly will continue to be displayed.

The above discussion of the merging techniques that may be employed is merely an example of various known merging techniques that may be used in embodiments of the present invention, but it will be appreciated by those skilled in the art that any other suitable merging techniques may be used instead. The merging logic 210 may take the form of appropriate hardware to perform such merging techniques, or alternatively may be embodied by suitable software running on a processor within the display controller. As such merging techniques will be well-known by those skilled in the art, the implementation of the merging logic 210 will not be discussed in more detail herein.

The combined display data output by the merging logic 210 over path 212 may be directly output to a connected display device, such as an integrated LCD. Alternatively, as an optional feature, the combined output data may first be passed through encryption logic 240 in order to produce an encrypted output signal for output to the display device over path 242. Such an approach may be appropriate, for example, if the output data is output in digital format via some digital interface from where it can be received by a separate display device connected to that interface. By encrypting the output display data, this can help prevent unauthorised copying of the secure data contained within that output data stream. It will be appreciated that the encryption logic 240 can employ any suitable encryption technique, and may be embodied by suitable hardware, or by software running on a processor.

As an alternative to encryption, or indeed in addition to encryption, the display controller 200 may be arranged to incorporate within the combined display data a watermark giving an indication of the source of the output display data.

Such a watermark may be input to the merging logic 210 over path 214, or alternatively could be added to the secure data prior to placing in the secure buffer 40. As will be appreciated by those skilled in the art, watermarks do not typically cause any discernible degradation in the output signal, but can be determined by comparison of the copied data containing the watermark with the original data from which that copy has been made, and accordingly can provide useful information about the source of the copy. Clearly in the event that the copy has been obtained by unauthorised means, this can be useful in tracking down the source of the unauthorised copy or copies.

Figure 4:
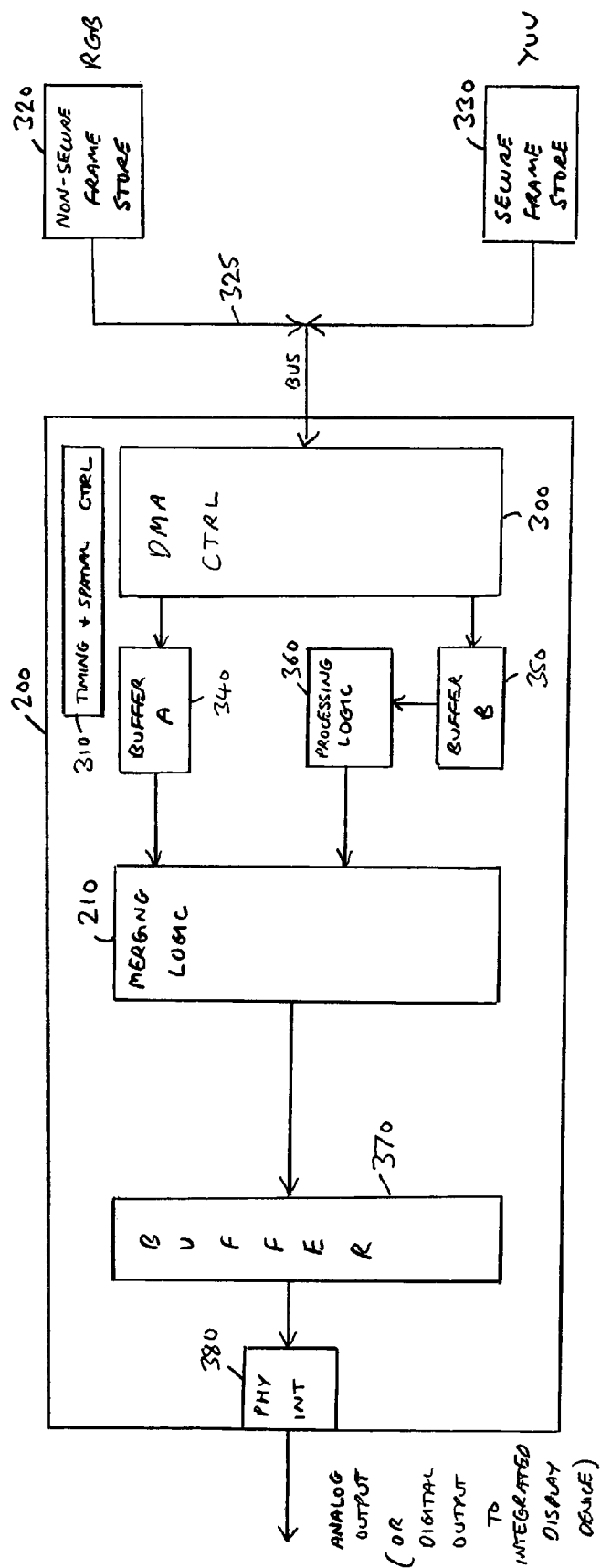
FIGS. 4 to 6 are block diagrams illustrating display controllers in accordance with different embodiments of the present invention.

FIG. 4 is a block diagram of a display controller 200 in accordance with one embodiment of the present invention, which illustrates how the additional functions described with reference to FIG. 3 are incorporated within the existing display controller logic. As can be seen from FIG. 4, the display controller 200 includes a Direct Memory Access (DMA) controller 300 arranged to access both the non-secure frame store 320 and the secure frame store 330 via a single memory bus 325. The DMA controller 300 is controlled by a timing and spatial controller 310 which controls the timing of the retrieval of the data from the frame stores, and determines from which frame store to retrieve data for any particular pixel location on the display, so as to ensure that data is retrieved at the speed required for output to the display device. Buffer A 340 is arranged to receive data retrieved from the non-secure frame store 320 whilst buffer B 350 is arranged to receive data retrieved from the secure frame store 330.

Processing logic 360 is provided, which incorporates any necessary processing functionality required to perform processing functions on the secure data prior to it being output to the merging logic 210. Hence, with reference to FIG. 3, the processing logic 360 may incorporate the colour space conversion logic 220 and the filtering and scaling logic 230. If required, such processing logic may also be provided in association with buffer A, or indeed could be provided solely in association with buffer A and not with buffer B if appropriate. Once the received data from the non-secure frame store 320 and the secure frame store 330 are in the appropriate format (for example RGB format) and have been filtered and scaled as required, that data is output to the merging logic 220 where the merging function described earlier is performed. The resultant data can then be output to a buffer 370 from where it is then output via a physical interface 380 to a connected display device. The physical interface 380 may include a digital-to-analogue converter for converting the digital signal into an analogue signal for output to the display device. In such situations, it may be considered unnecessary to incorporate any encryption logic to encrypt the signal, as typically content providers are more concerned about their content being copied and distributed in an unauthorised manner in the digital domain than they are in it being copied and distributed in an analogue format. This is due to the fact that the quality of analogue copies diminishes through each replication of the copying process. If desired, watermarking could still be added to the digital stream, for example by the merging logic 210 as described earlier with reference to FIG. 3, even if ultimately the data is to be output from the physical interface 380 in an analogue form.

It is also possible that the FIG. 4 embodiment of the display controller could be used in association with an integrated display device, where the physical interface 380 may output the signal in a digital form, but where that digital form cannot be intercepted between the physical interface 380 and the display device, and accordingly is not prone to unauthorised access.

Figure 5:
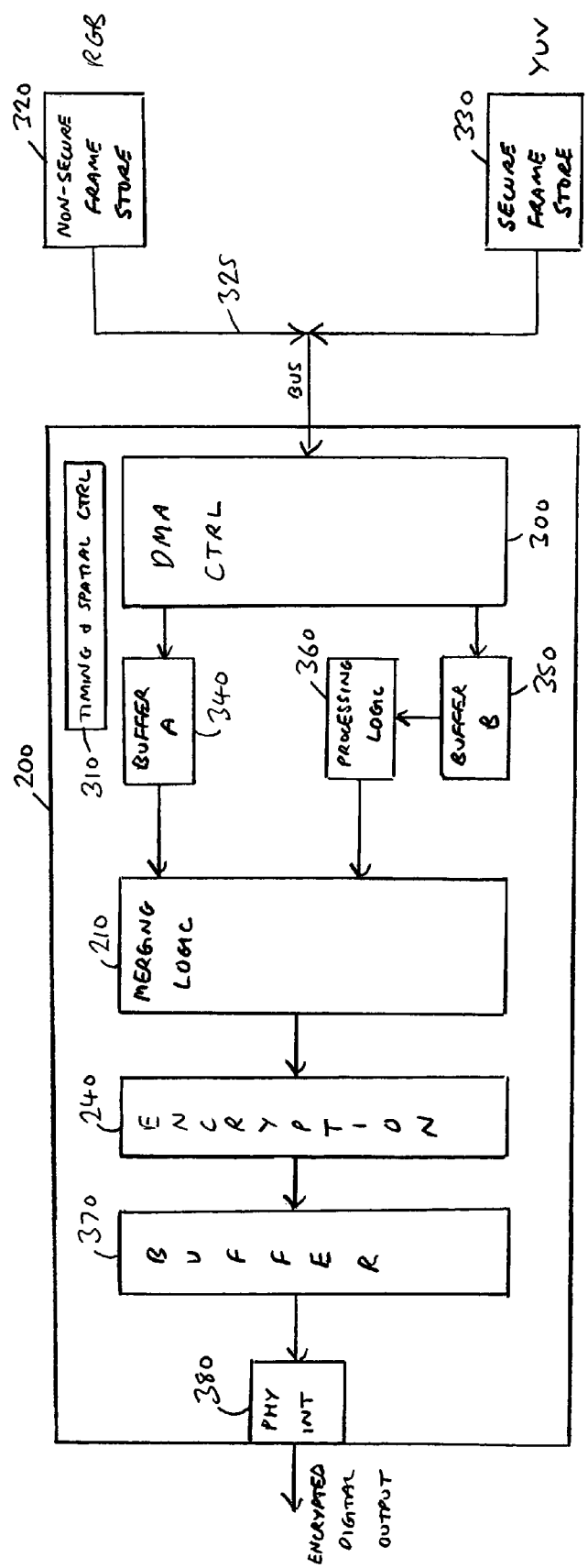

FIG. 5 illustrates an alternative embodiment of the display controller 200, which is arranged in the same way as the display controller 200 of FIG. 4, but which includes encryption logic 240. The encryption logic will typically be placed between the merging logic 210 and the buffer 370, such that by the time the data is stored in the buffer 370 it is in the encrypted format. This would then enable an encrypted digital output signal to be output from the physical interface 380, which may then be routed to a separate display device. Since the digital output is encrypted, this provides protection against unauthorised access to the secure data contained within the output data stream.

Figure 6:
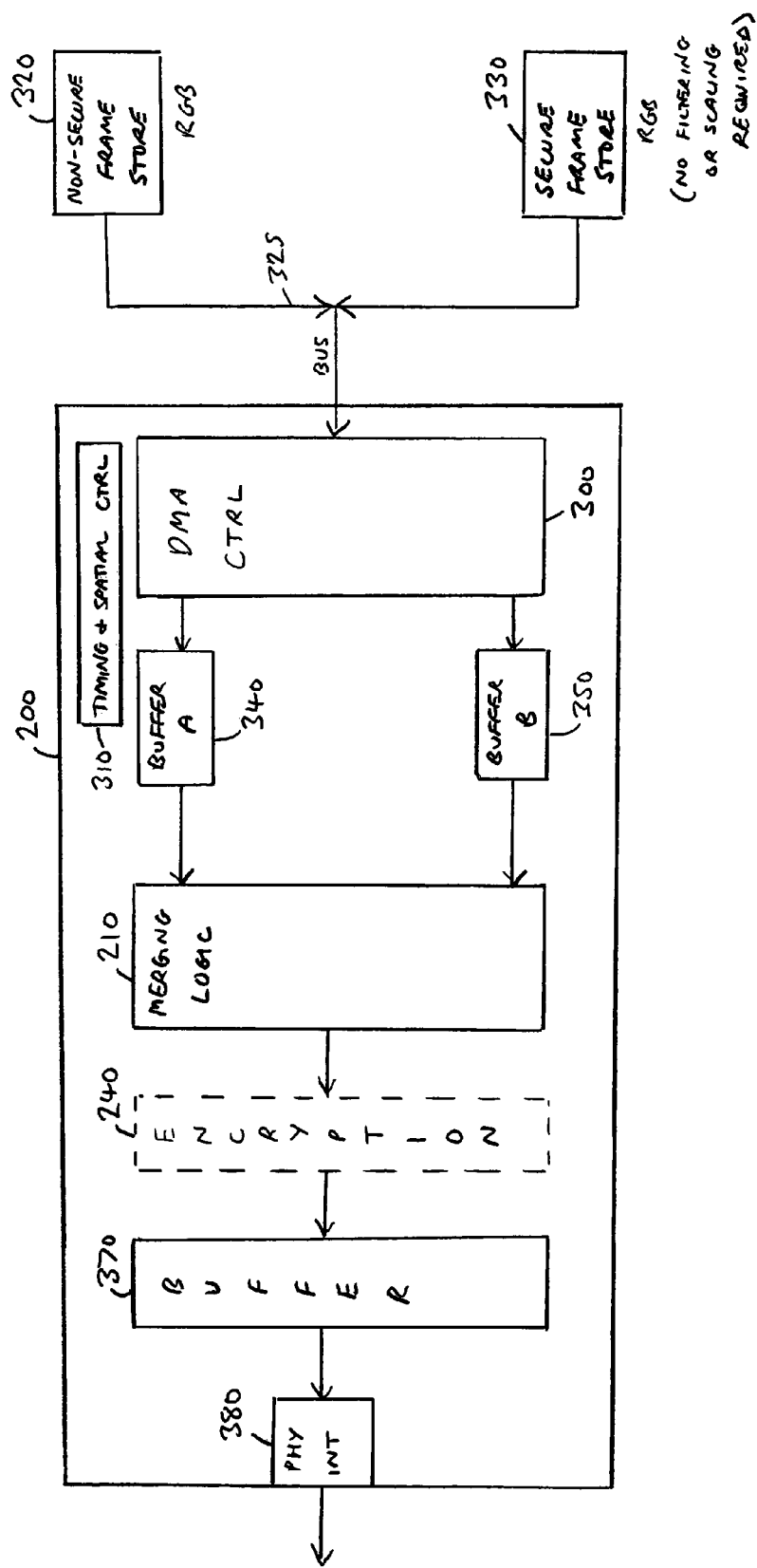

FIG. 6 illustrates a further alternative embodiment of the display controller 200, in which both the non-secure frame store 320 and the secure frame store 330 are arranged to store data in the format required by the merging logic, for example in RGB format. Furthermore, it is assumed that by the time the secure data has been stored in the secure frame store, any necessary filtering or scaling has already been performed. In such embodiments, there is no longer a requirement for the processing logic 360, and instead the merging logic 210 may directly receive the outputs from buffer A 340 and buffer B 350. Again, encryption logic 240 can be included if required.

In FIGS. 4 to 6, the display controller 200 has been shown as being connected to the non-secure frame store 320 and the secure frame store 330 via a single bus 325. However, it will be appreciated that in alternative embodiments, two separate buses could be provided, one connecting the display controller with the non-secure frame store 320, and a separate bus connecting the display controller 200 with the secure frame store 330. In such embodiments, separate DMA controllers may be provided.

It will be appreciated that the buffers 340, 350 and 370 shown in FIGS. 4 to 6 may take a variety of forms. However, in preferred embodiments, these buffers are typically arranged as First-In-First-Out (FIFO) buffers. Additionally, for efficiency reasons, the DMA controller 300 is typically arranged to access data from the frame stores in multi-word blocks, as this makes more efficient use of the available memory bandwidth.

Figure 7:
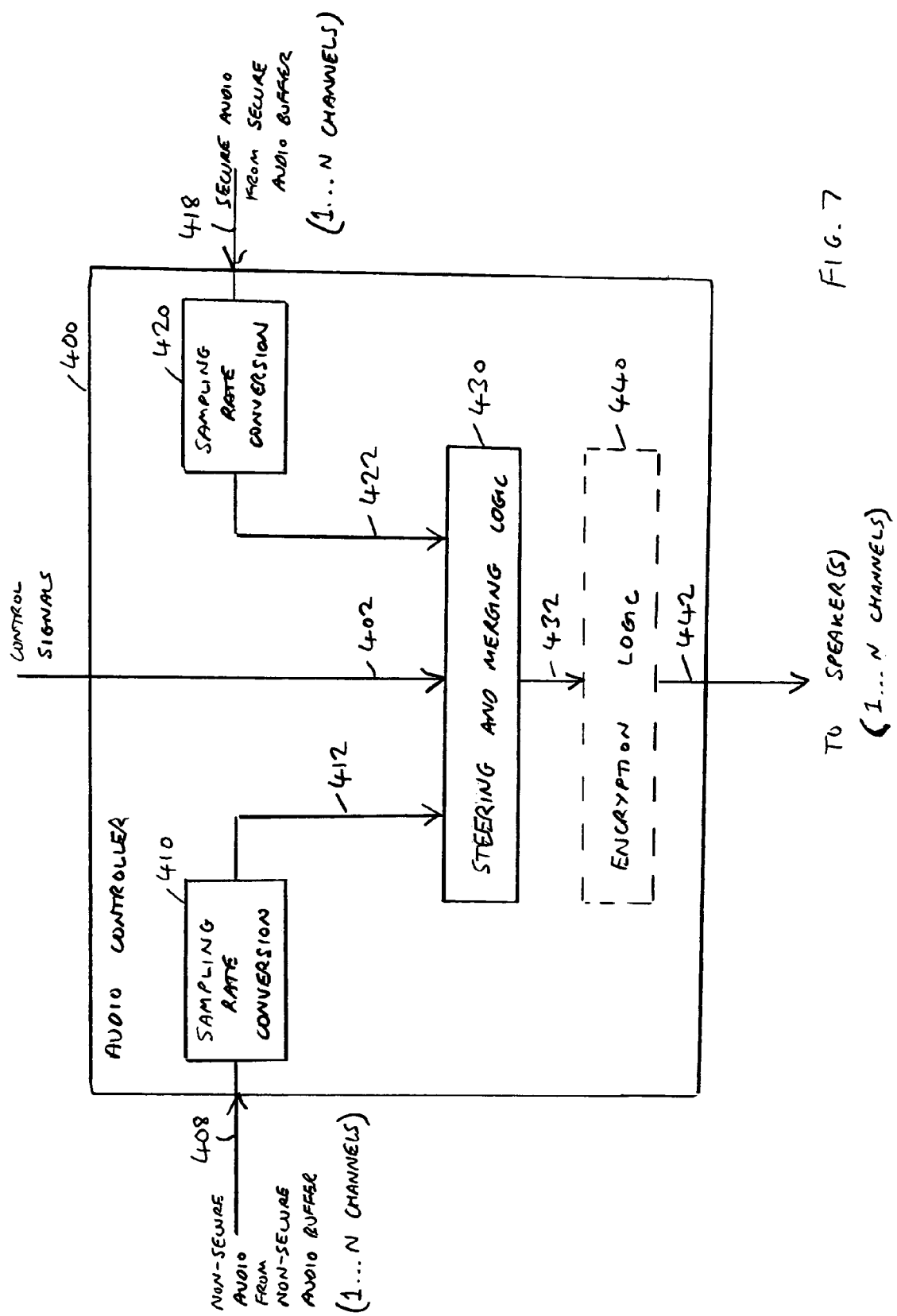
FIG. 7 is a block diagram schematically illustrating logic incorporated within an audio controller in accordance with one embodiment of the present invention.

FIG. 7 illustrates an alternative embodiment of an output controller, where in this embodiment the output controller takes the form of an audio controller 400 used to merge secure and non-secure audio data into an output audio stream. The audio controller 400 is provided with steering and merging logic 430 which receives control signals over path 402 for controlling the steering and merging operation, these control signals typically being obtained from the processor, or from a control register under the control of the processor. However, they may alternatively come from a different source, for example a balance control on a radio.

Steering is employed in order to output a chosen input audio channel on one or more output channels chosen from a group in order to choose the spatial position of the input signal within the output channels. The amplitude of the input signal to be passed to each output channel is determined in a per-output-channel fashion, i.e. it can all be passed to one output channel, can be passed 100% to two or more output channels, or can be assigned a variable volume at the output, e.g. 50% to channel A, 80% to channel B. Where there is more than one input channel, then each may be steered separately (or in some predetermined relationship) and the results summed for each output channel.

Typically, the steering and merging logic will require the input audio signals to be received at a particular data rate, and accordingly sampling rate conversion logic 410, 420 may be provided in association with each audio data source. Accordingly, non-secure audio data from the non-secure audio buffer can be received over path 408, where it is then subjected to any appropriate sampling rate conversion prior to outputting that data over path 412 to the steering and merging logic 430. Similarly, the secure audio data from the secure audio buffer can be received over path 418, where it is subjected to any appropriate sampling rate conversion by the sampling rate conversion logic 420 prior to that data being output over path 422 to the steering and merging logic 430. Such sampling rate conversion techniques will be readily understood by those skilled in the art, and accordingly will not be discussed further herein.

The steering and merging logic 430 will then perform appropriate merging techniques to merge the non-secure and secure data to form a single output data stream. Further, as each source may produce between one and N channels of audio data, the merging functionality can be performed for each channel independently. In addition, as mentioned earlier, particular input channels may need to be steered to different output channels either fully or partially (for example, it may be desired to convert a mono input channel into stereo, where it appears to come from just left of centre). Appropriate steering functionality can hence be provided within the steering and merging logic 430 to perform such audio steering functions. Separate steering logic may be provided for each input source, to allow individual sources to be steered before the merging. In addition, or alternatively, steering logic may be arranged to act upon the merged signal (i.e. placed after the merging logic) in order to control the merged signal as a whole (e.g. to perform balance control of the combined signal).

It will be appreciated that the merging logic may be arranged in a variety of ways. In one embodiment, amplitude scaling is applied to each of the input signals to enable the relative volume levels of the signals to be set before merging, after which merging is performed by summing the constituent input signals.

Once the combined audio stream has been produced by the steering and merging logic 430, it can be output directly to appropriate speakers, or instead can be routed via encryption logic 440, where any appropriate encryption is performed prior to output of the data to the speakers. As with the earlier discussion of display controllers, such encryption may be appropriate if the combined output audio data stream is to be output in the digital domain via a digital interface, and not directly to some integrated speakers within the data processing apparatus, in order to protect against unauthorised access to the combined data stream with the aim of copying the secure data within that combined audio data stream.

As with the earlier description of the display controller, the audio controller 400 may incorporate a digital to analogue converter to convert the combined audio stream into an analogue signal before it is output.

Figure 8:
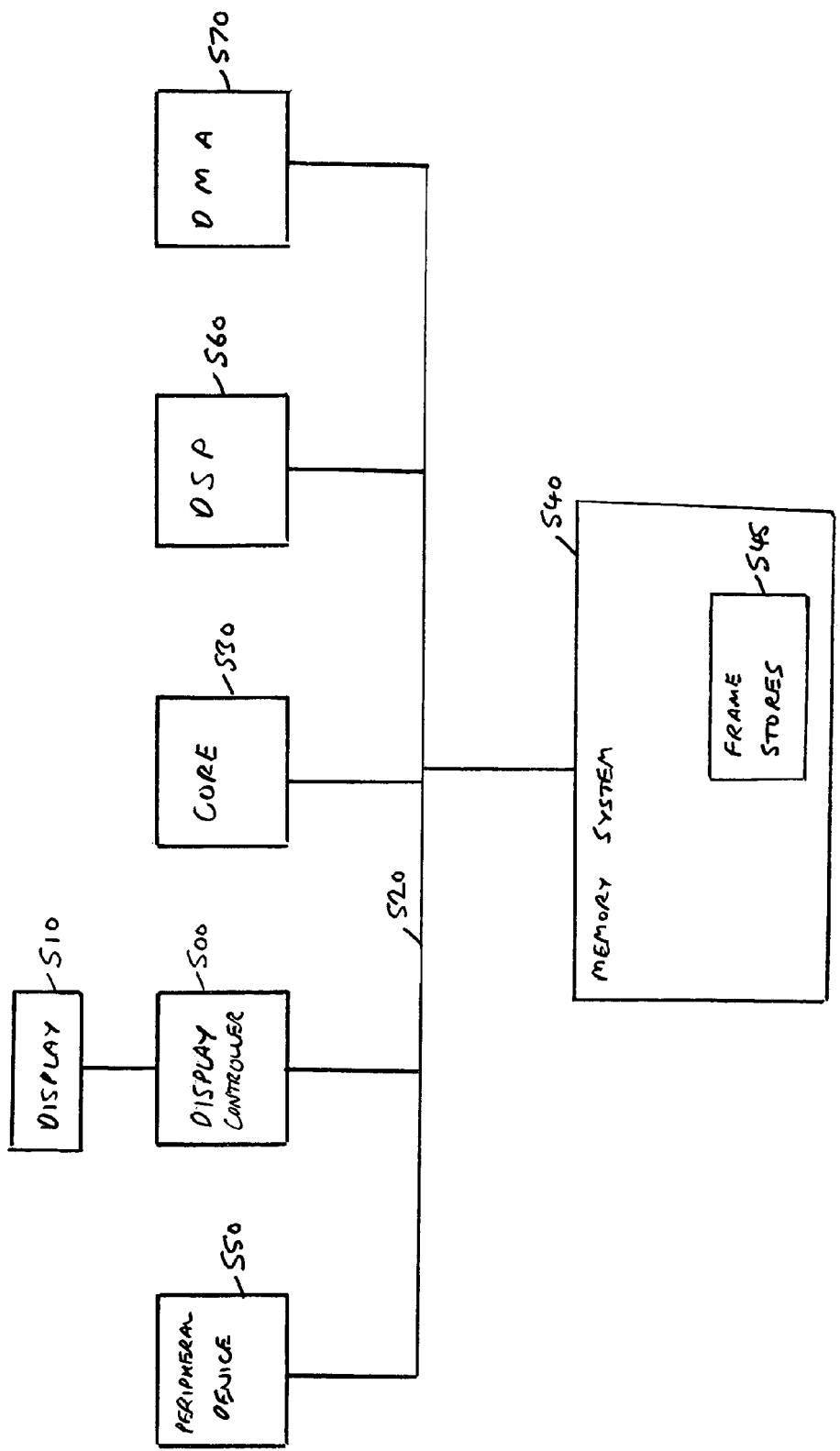
FIG. 8 is a block diagram illustrating a data processing apparatus in which the techniques of embodiments of the present invention may be employed.

FIG. 8 is a block diagram schematically illustrating a suitable data processing apparatus in which the embodiments of the present invention may be employed. The data processing apparatus will typically include a number of devices which can access data stored within a memory system 540 via one or more memory buses 520. Within the memory system, the non-secure frame store and secure frame store will be provided, as indicated by the frame stores 545 in FIG. 8. The devices that may access the memory system may include one or more processor cores 530, a digital signal processor (DSP) 560, a direct memory access (DMA) controller 570, a display controller 500 connected to a display 510, or some other peripheral device 550. A display controller may take the form of one of the display controllers described earlier with reference to FIGS. 3 to 6, and in particular may include a DMA controller for accessing the frame stores 545 via the one or more memory buses 520 in order to retrieve the non-secure data and the secure data required in order to produce each frame of display data. However, once that data has been retrieved, colour space conversion, filtering and scaling can be performed internally within the display controller without needing to write data back to the frame stores, thereby significantly reducing the memory bandwidth that would otherwise be required if such functions were performed on the data stored in the memory system prior to it being placed within the frame stores, as would for example be the case if those functions were performed by appropriate software executing on the processor core 530.

In the embodiment illustrated in FIG. 8, it is envisaged that the processor core 530 would run the necessary non-secure and secure processes required to produce the non-secure data and secure data for storing in the non-secure frame store and the secure frame store. As discussed earlier, once the secure process has produced the required secure data, this data can be placed directly within the secure frame store, where it will not be accessible by any non-secure process, and accordingly will not be subjected to any unauthorised access.

It will be appreciated that the data processing apparatus of FIG. 8 could also be arranged to incorporate an audio controller such as that described with reference to FIG. 7 for combining both non-secure audio data and secure audio data in order to generate a single output audio stream.

From the above description, it will be appreciated that embodiments of the present invention provide an improved technique for merging secure and non-secure data into an output data stream, which reduces the likelihood of unauthorised access to the secure data, and further enables a significant reduction in the memory bandwidth required and the processing required by the processor core.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, comprising:
   at least one processor configured to execute a non-secure process producing non-secure data to be included in an output data stream, and to execute a secure process producing secure data to be included in the output data stream;
   a non-secure buffer configured to receive the non-secure data produced by the non-secure process;
   a secure buffer configured to receive the secure data produced by the secure process, the secure buffer not being accessible by the non-secure process; and
   an output controller configured to read the non-secure data from the non-secure buffer and the secure data from the secure buffer and having merging logic configured to merge the non-secure data and the secure data producing a combined data stream, the output controller being further configured to derive the output data stream from the combined data stream.

2. A data processing apparatus as claimed in claim 1, wherein the processor is configured to manage access permission data for the secure buffer, and to define the access permission data such that the secure buffer is not accessible by the non-secure process.

3. A data processing apparatus as claimed in claim 1, wherein the non-secure buffer and the secure buffer are provided within a memory system, and wherein the memory system is configured to manage access to the secure buffer, and to prevent access to the secure buffer by the non-secure process.

4. A data processing apparatus as claimed in claim 1, wherein the secure buffer is arranged so that its content cannot be read by the processor.

5. A data processing apparatus as claimed in claim 1, wherein the merging logic is arranged to receive the non-secure data and the secure data in a first predetermined format, at least one of the non-secure and secure buffers being configured to store data in a second predetermined format, the output controller further comprising conversion logic associated with the at least one of the non-secure and secure buffers and configured to convert data received from that buffer from the second predetermined format into the first predetermined format prior to that data being received by the merging logic.

6. A data processing apparatus as claimed in claim 5, wherein the secure buffer is configured to store the secure data in the second predetermined format.

7. A data processing apparatus as claimed in claim 5, wherein the output controller is a display controller, the non-secure data and secure data are display data, the non-secure buffer is a non-secure frame store, and the secure buffer is a secure frame store, and wherein the conversion logic is configured to perform a colour space conversion process.

8. A data processing apparatus as claimed in claim 7, wherein the first predetermined format is an RGB format, the second predetermined format is a YUV format, and the at least one of the non-secure and secure buffers is configured to store image data in said YUV format.

9. A data processing apparatus as claimed in claim 7, wherein the display controller further comprises filtering logic configured to perform a filtering process on image data received from an associated one of said non-secure and secure frame stores prior to that image data being received by the merging logic, the display controller further comprises scaling logic configured to perform a scaling process on image data received from an associated one of said non-secure and secure frame stores prior to that image data being received by the merging logic and wherein the conversion logic, filtering logic and scaling logic are associated with the secure frame store.

10. A data processing apparatus as claimed in claim 1, further comprising an output device connected to the output controller to receive the output data stream, whereby the output data stream is not accessible by any non-secure process.

11. data processing apparatus as claimed in claim 1, wherein the output controller further comprises encryption logic configured to encrypt the combined data stream prior to output as the output data stream, whereby the output data stream is not accessible by any non-secure process.

12. A data processing apparatus as claimed in claim 1, wherein the output controller is configured to provide a watermark in the output data stream.

13. A data processing apparatus as claimed in claim 1, wherein the output controller further comprises a digital to analogue converter for converting the combined data stream into an analogue signal prior to output as the output data stream.

14. A data processing apparatus as claimed in claim 1, wherein the output controller is a display controller, the non-secure data and secure data are display data, the non-secure buffer is a non-secure frame store, and the secure buffer is a secure frame store.

15. A data processing apparatus as claimed in claim 14, wherein the output data stream is a frame of display data.

16. A data processing apparatus as claimed in claim 14, wherein the display controller further comprises filtering logic configured to perform a filtering process on image data received from an associated one of said non-secure and secure frame stores prior to that image data being received by the merging logic.

17. A data processing apparatus as claimed in claim 14, wherein the display controller further comprises scaling logic configured to perform a scaling process on image data received from an associated one of said non-secure and secure frame stores prior to that image data being received by the merging logic.

18. An output controller for a data processing apparatus, the data processing apparatus having at least one processor configured to execute a non-secure process producing non-secure data to be included in an output data stream, and to execute a secure process producing secure data to be included in the output data stream, a non-secure buffer configured to receive the non-secure data produced by the non-secure process, and a secure buffer configured to receive the secure data produced by the secure process, the secure buffer not being accessible by the non-secure process, the output controller comprising:
  at least one read interface configured to read the non-secure data from the non-secure buffer and the secure data from the secure buffer;
  merging logic configured to merge the non-secure data and the secure data in order to produce a combined data stream; and
  output means configured to derive the output data stream from the combined data stream.

19. An output controller as claimed in claim 18, wherein the merging logic is arranged to receive the non-secure data and the secure data in a first predetermined format, at least one of the non-secure and secure buffers being configured to store data in a second predetermined format, the output controller further comprising:
  conversion logic associated with the at least one of the non-secure and secure buffers and configured to convert data received from that buffer from the second predetermined format into the first predetermined format prior to that data being received by the merging logic.

20. An output controller as claimed in claim 19, wherein the secure buffer is configured to store the secure data in the second predetermined format.

21. An output controller as claimed in claim 19, wherein the output controller is a display controller, the non-secure data and secure data are display data, the non-secure buffer is a non-secure frame store, and the secure buffer is a secure frame store, and wherein the conversion logic is configured to perform a colour space conversion process.

22. An output controller as claimed in claim 21, wherein the first predetermined format is an RGB format, the second predetermined format is a YUV format, and the at least one of the non-secure and secure buffers is configured to store image data in said YUV format.

23. An output controller as claimed in claim 21, wherein the display controller further comprises:
  filtering logic configured to perform a filtering process on image data received from an associated one of said non-secure and secure frame stores prior to that image data being received by the merging logic;
  scaling logic configured to perform a scaling process on image data received from an associated one of said non-secure and secure frame stores prior to that image data being received by the merging logic; and
  wherein the conversion logic, filtering logic and scaling logic are associated with the secure frame store.

24. An output controller as claimed in claim 18, further comprising an output device connected to the output controller to receive the output data stream, whereby the output data stream is not accessible by any non-secure process. signal prior to output as the output data stream.

25. An output controller as claimed in claim 18, further comprising:
  encryption logic configured to encrypt the combined data stream prior to output as the output data stream, whereby the output data stream is not accessible by any non-secure process.

26. An output controller as claimed in claim 18, further comprising means for providing a watermark in the output data stream.

27. An output controller as claimed in claim 18, further comprising:
  a digital to analogue converter for converting the combined data stream into an analogue signal prior to output as the output data stream.

28. An output controller as claimed in claim 18, wherein the output controller is a display controller, the non-secure data and secure data are display data, the non-secure buffer is a non-secure frame store, and the secure buffer is a secure frame store.

29. An output controller as claimed in claim 28, wherein the output data stream is a frame of display data.

30. An output controller as claimed in claim 28, wherein the display controller further comprises:
  filtering logic configured to perform a filtering process on image data received from an associated one of said non-secure and secure frame stores prior to that image data being received by the merging logic.

31. An output controller as claimed in claim 28, wherein the display controller further comprises:
  scaling logic configured to perform a scaling process on image data received from an associated one of said non-secure and secure frame stores prior to that image data being received by the merging logic.

32. A method of merging secure and non-secure data into an output data stream, comprising the steps of:
  executing a non-secure process producing the non-secure data to be included in the output data stream;
  executing a secure process producing the secure data to be included in the output data stream;
  storing the non-secure data in a non-secure buffer;
  storing the secure data in a secure buffer, the secure buffer not being accessible by the non-secure process;
  employing an output controller to read the non-secure data from the non-secure buffer and the secure data from the secure buffer;
  merging within the output controller the non-secure data and the secure data producing a combined data stream; and
  deriving the output data stream from the combined data stream.

33. A method as claimed in claim 32, wherein a processor manages access permission data for the secure buffer, and the method further comprises the step of defining the access permission data such that the secure buffer is not accessible by the non-secure process.

34. A method as claimed in claim 32, wherein the non-secure buffer and the secure buffer are provided within a memory system, and the method further comprises the step of employing the memory system to manage access to the secure buffer preventing access to the secure buffer by the non-secure process.

35. A method as claimed in claim 32, further comprising the step of arranging the secure buffer so that its content cannot be read by the processor.

36. A method as claimed in claim 32, wherein the merging step is performed on the non-secure data and the secure data in a first predetermined format, at least one of the non-secure and secure buffers being configured to store data in a second predetermined format, and the method further comprising:
  converting within the output controller data received from the at least one of the non-secure and secure buffers from the second predetermined format into the first predetermined format prior to that data being used in the merging step.

37. A method as claimed in claim 36, wherein the secure buffer is configured to store the secure data in the second predetermined format.

38. A method as claimed in claim 36, wherein the output controller is a display controller, the non-secure data and secure data are display data, the non-secure buffer is a non-secure frame store, and the secure buffer is a secure frame store, and wherein the converting step performs a colour space conversion process.

39. method as claimed in claim 38, wherein the first predetermined format is an RGB format, the second predetermined format is a YUV format, and the at least one of the non-secure and secure buffers is configured to store image data in said YUV format.

40. A method as claimed in claim 38, further comprising the step of performing a filtering process on image data received from an associated one of said non-secure and secure frame stores prior to that image data being used in the merging step, and further comprising the step of performing a scaling process on image data received from an associated one of said non-secure and secure frame stores prior to that image data being used in the merging step, wherein the converting step, filtering step and scaling step are performed on secure data from the secure frame store.

41. A method as claimed in claim 32, further comprising the step of providing an output device connected to the output controller to receive the output data stream, whereby the output data stream is not accessible by any non-secure process.

42. A method as claimed in claim 32, further comprising the step of encrypting the combined data stream prior to output as the output data stream, whereby the output data stream is not accessible by any non-secure process.

43. A method as claimed in claim 32, further comprising the step of providing a watermark in the output data stream.

44. A method as claimed in claim 32, further comprising the step of converting the combined data stream into an analogue signal prior to output as the output data stream.

45. A method as claimed in claim 32, wherein the output controller is a display controller, the non-secure data and secure data are display data, the non-secure buffer is a non-secure frame store, and the secure buffer is a secure frame store.

46. A method as claimed in claim 42, wherein the output data stream is a frame of display data.

47. A method as claimed in claim 45, further comprising the step of performing a filtering process on image data received from an associated one of said non-secure and secure frame stores prior to that image data being used in the merging step.

48. A method as claimed in claim 45, further comprising the step of performing a scaling process on image data received from an associated one of said non-secure and secure frame stores prior to that image data being used in the merging step.

* * * * *